US011455299B1

(12) United States Patent
Chu et al.

(10) Patent No.: US 11,455,299 B1
(45) Date of Patent: *Sep. 27, 2022

(54) PROVIDING CONTENT IN RESPONSE TO USER ACTIONS

(71) Applicant: Google LLC, Mountain View, CA (US)

(72) Inventors: Michael Chu, Los Altos Hills, CA (US); Michele Covell, Woodside, CA (US); Joshua J. Sacks, Woodside, CA (US); Shumeet Baluja, La Jolla, CA (US); Zhengrong Ji, Sunnyvale, CA (US)

(73) Assignee: Google LLC, Mountain View, CA (US)

( * ) Notice: Subject to any disclaimer, the term of this patent is extended or adjusted under 35 U.S.C. 154(b) by 723 days.

This patent is subject to a terminal disclaimer.

(21) Appl. No.: 16/293,898

(22) Filed: Mar. 6, 2019

Related U.S. Application Data

(63) Continuation of application No. 13/894,645, filed on May 15, 2013, now Pat. No. 10,262,029.

(51) Int. Cl.
*G06F 7/00* (2006.01)
*G06F 17/30* (2006.01)
*G06F 16/245* (2019.01)

(52) U.S. Cl.
CPC .................. *G06F 16/245* (2019.01)

(58) Field of Classification Search
CPC .................................................. G06F 16/245
USPC ....................................................... 707/769
See application file for complete search history.

(56) References Cited

U.S. PATENT DOCUMENTS

| | | |
|---|---|---|
| 8,306,922 B1 | 11/2012 | Kunal et al. |
| 8,447,852 B1 | 5/2013 | Penumaka et al. |
| 8,521,584 B1 | 8/2013 | Feng et al. |
| 8,892,591 B1 | 11/2014 | Haugen et al. |
| 10,748,159 B1 * | 8/2020 | Selinger ................. G06Q 30/02 |
| 2006/0253584 A1 | 11/2006 | Dixon et al. |
| 2008/0189283 A1 | 8/2008 | Quoc et al. |
| 2008/0254741 A1 | 10/2008 | Irvin |
| 2009/0182589 A1 | 7/2009 | Kendall |
| 2010/0114887 A1 | 5/2010 | Conway |
| 2010/0228631 A1 | 9/2010 | Zhang |
| 2010/0306249 A1 | 12/2010 | Hill et al. |
| 2010/0332330 A1 | 12/2010 | Goel |
| 2011/0029513 A1 | 2/2011 | Morris |
| 2011/0125555 A1 | 5/2011 | Fradkin |
| 2011/0196932 A1 | 8/2011 | Jackson et al. |
| 2011/0246910 A1 | 10/2011 | Moxley et al. |
| 2011/0276397 A1 | 11/2011 | Moxley |
| 2011/0288937 A1 | 11/2011 | Manoogian |
| 2011/0320250 A1 * | 12/2011 | Gemmell ............... G06Q 30/02 |
| | | 705/14.1 |
| 2012/0066618 A1 | 3/2012 | Barker et al. |

(Continued)

*Primary Examiner* — Binh V Ho
(74) *Attorney, Agent, or Firm* — Fish & Richardson P.C.

(57) ABSTRACT

Methods, systems and apparatus, including computer programs encoded on a computer storage medium for selecting keywords for resources are disclosed. In one aspect, a search query is received associated with a first user. A determination is made that the first user is a follower of an entity feed that is provided by a first entity and that is provided through a social network. A content item is selected having distribution parameters specifying that the content item is to be provided to users that are followers of the entity feed and that submit the search query. The selected content item is provided for the first user.

20 Claims, 4 Drawing Sheets

(56) References Cited

U.S. PATENT DOCUMENTS

| | | |
|---|---|---|
| 2012/0102130 A1 | 4/2012 | Guyot et al. |
| 2012/0124073 A1 | 5/2012 | Gross |
| 2012/0158494 A1 | 6/2012 | Reis |
| 2012/0173626 A1 | 7/2012 | Reis et al. |
| 2012/0197980 A1 | 8/2012 | Terleski |
| 2012/0272160 A1 | 10/2012 | Spivack et al. |
| 2012/0278164 A1 | 11/2012 | Spivack et al. |
| 2012/0290446 A1 | 11/2012 | England et al. |
| 2012/0290938 A1* | 11/2012 | Subbarao ............ H04L 67/535 715/738 |
| 2012/0296991 A1 | 11/2012 | Spivack et al. |
| 2013/0054591 A1 | 2/2013 | Park et al. |
| 2013/0097236 A1* | 4/2013 | Khorashadi ........... G06F 16/951 709/204 |
| 2013/0097246 A1 | 4/2013 | Zifroni |
| 2013/0132357 A1 | 5/2013 | Edgar et al. |
| 2013/0227020 A1 | 8/2013 | Ruffner et al. |
| 2013/0268513 A1 | 10/2013 | Wu et al. |
| 2013/0332460 A1 | 12/2013 | Pappas et al. |
| 2014/0025667 A1 | 1/2014 | Lowe |
| 2014/0101163 A1 | 4/2014 | Adams |
| 2014/0136521 A1 | 5/2014 | Pappas |
| 2014/0280134 A1 | 9/2014 | Horen |
| 2016/0080485 A1 | 3/2016 | Hamedi |
| 2017/0249658 A1 | 8/2017 | Bargas |

\* cited by examiner

PROVIDING CONTENT IN RESPONSE TO USER ACTIONS

CROSS-REFERENCE TO RELATED APPLICATION

This application is a continuation application of U.S. application Ser. No. 13/894,645, filed May 15, 2013, which is incorporated by reference.

BACKGROUND

This specification relates to data processing and content distribution.

The Internet provides access to a wide variety of resources. For example, video and/or audio files, as well as web pages for particular subjects or particular news articles are accessible over the Internet. Access to these resources presents opportunities for content items to be provided with the resources and presented in content item slots. For example, a web page can include advertisement slots in which advertisements can be presented. These advertisements slots can be defined in the web page or defined for presentation with a web page.

SUMMARY

In general, one innovative aspect of the subject matter described in this specification can be implemented in methods that include a computer-implemented method for providing content. The method includes receiving a search query associated with a first user. The method further includes determining, by the one or more data processing apparatus, that the first user is a follower of an entity feed that is provided by a first entity and that is provided through a social network. The method further includes selecting, by the one or more data processing apparatus, a content item having distribution parameters specifying that the content item is to be provided to users that are followers of the entity feed and that submit the search query. The method further includes providing, by the one or more data processing apparatus, the selected content item to a user device associated with the first user.

These and other implementations can each optionally include one or more of the following features. Determining that the first user is a follower of the entity feed can include determining that the first user is a primary follower of the entity feed based on information indicating that a request was made to receive the entity feed, and the first user's request to receive the entity feed can be independent of the first entity requesting to receive the first user's feed. Determining that the first user is a follower of the entity feed can include determining that the first user is a secondary follower of the entity feed based on information that the secondary follower follows a primary follower of the entity feed. The method can further include receiving, from a content item provider, distribution parameters specifying that the content item is eligible for distribution to users that submit a search query matching a distribution keyword and are followers of the entity feed; receiving a bid specifying a maximum amount that the content item provider will pay for distribution of the content item based on the distribution parameters being met; and determining that the received search query matches the distribution keyword. The method can further include determining that the first entity and a second entity are correlated entities based on similarities between online activity related to both of the first and the second entity, and providing, in response to determining that the first entity and the second entity are correlated entities, a content item for the second entity based on the user being a follower of the entity feed for the first entity. Determining that the first entity and the second entity are correlated entities can include determining that a search page co-occurrence rate for the first entity and the second entity meets a threshold search page co-occurrence rate, where the search page co-occurrence rate is based on a number of search result pages in which both the first entity and the second entity are referenced relative to a total number of search results pages in which at least one of the first entity or the second entity are referenced. Determining that the first entity and the second entity are correlated entities can include determining that a user co-selection rate for the first entity and the second entity meets a threshold user co-selection rate, where the user co-selection rate is based on a number of users that have interacted with content items provided by each of the first entity and the second entity relative to a total number of users that have interacted with a content item provided by one of the first entity or the second entity.

In general, another innovative aspect of the subject matter described in this specification can be implemented in computer program products that include a computer program product tangibly embodied in a computer-readable storage device and comprising instructions. The instructions, when executed by one or more data processing apparatus, cause the one or more data processing apparatus to perform operations including receiving a search query associated with a first user; determining that the first user is a follower of an entity feed that is provided by a first entity and that is provided through a social network; selecting a content item having distribution parameters specifying that the content item is to be provided to users that are followers of the entity feed and that submit the search query; and providing the selected content item to a user device associated with the first user.

These and other implementations can each optionally include one or more of the following features. Determining that the first user is a follower of the entity feed can include determining that the first user is a primary follower of the entity feed based on information indicating that a request was made to receive the entity feed, and the first user's request to receive the entity feed can be independent of the first entity requesting to receive the first user's feed. Determining that the first user is a follower of the entity feed can include determining that the first user is a secondary follower of the entity feed based on information that the secondary follower follows a primary follower of the entity feed. The instructions can further include instructions for receiving, from a content item provider, distribution parameters specifying that the content item is eligible for distribution to users that submit a search query matching a distribution keyword and are followers of the entity feed; receiving a bid specifying a maximum amount that the content item provider will pay for distribution of the content item based on the distribution parameters being met; and determining that the received search query matches the distribution keyword. The instructions can further include instructions for determining that the first entity and a second entity are correlated entities based on similarities between online activity related to both of the first and the second entity, and providing, in response to determining that the first entity and the second entity are correlated entities, a content item for the second entity based on the user being a follower of the entity feed for the first entity. Determining that the first entity and the second entity are correlated entities can include determining that a search page co-occurrence rate for the first entity and the second entity meets a threshold search page co-occurrence rate, where the search page co-occurrence rate is based on a number of search result pages in which both the first entity and the second entity are referenced relative to a total number of search results pages in which at least one of the first entity or the second entity are referenced. Determining that the first entity and the second entity are correlated entities can include determining that a user co-selection rate for the first entity and the second entity meets a threshold user co-selection rate, where the user co-selection rate is based on a number of users that have interacted with content items provided by each of the first entity and the second entity relative to a total number of users that have interacted with a content item provided by one of the first entity or the second entity.

In general, another innovative aspect of the subject matter described in this specification can be implemented in systems, including a system for providing content. The system includes: a first data store storing entity definitions for a plurality of entities; a second data store storing follower information for users who follow entity feeds associated with the plurality of entities; a third data store storing distribution parameters for eligible content items, the distribution parameters identified by at least content sponsors and specifying conditions for selecting content items from among the eligible content items for presentation to users that follow the entity feeds; and data processing apparatus configured to interact with the data stores, the data processing apparatus being further configured to perform operations. The operations include receiving a search query associated with a first user; determining, by the one or more data processing apparatus and using the second data store, that the first user is a follower of an entity feed that is provided by a first entity and that is provided through a social network; selecting, by the one or more data processing apparatus and using information in the third data store, a content item having distribution parameters specifying that the content item is to be provided to users that are followers of the entity feed and that submit the search query; providing, by the one or more data processing apparatus, the selected content item to a user device associated with the first user.

These and other implementations can each optionally include one or more of the following features. Determining that the first user is a follower of the entity feed can include determining that the first user is a primary follower of the entity feed based on information indicating that a request was made to receive the entity feed, and the first user's request to receive the entity feed can be independent of the first entity requesting to receive the first user's feed. Determining that the first user is a follower of the entity feed can include determining that the first user is a secondary follower of the entity feed based on information that the secondary follower follows a primary follower of the entity feed. The operations can further include receiving, from a content item provider, distribution parameters specifying that the content item is eligible for distribution to users that submit a search query matching a distribution keyword and are followers of the entity feed; receiving a bid specifying a maximum amount that the content item provider will pay for distribution of the content item based on the distribution parameters being met; and determining that the received search query matches the distribution keyword. The operations can further include determining that the first entity and a second entity are correlated entities based on similarities between online activity related to both of the first and the second entity, and providing, in response to determining that the first entity and the second entity are correlated entities, a content item for the second entity based on the user being a follower of the entity feed for the first entity. Determining that the first entity and the second entity are correlated entities can include determining that the search page co-occurrence rate for the first entity and the second entity meets a threshold search page co-occurrence rate, where the search page co-occurrence rate is based on a number of search result pages in which both the first entity and the second entity are referenced relative to a total number of search results pages in which at least one of the first entity or the second entity are referenced.

Particular embodiments of the subject matter described in this specification can be implemented so as to realize one or more of the following advantages. Content sponsors and/or entities can specify to have their content presented to and/or selected based on users who are followers of entity feeds associated with entities.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This document describes devices, systems, and methods for distributing content items. Selection of a content item is based, at least in part, on whether a user for whom the content item is requested is a follower of an entity feed (e.g., a user that has requested content from the entity feed to be presented in the user's social network interface). For example, a user that is a follower of an entity feed for a particular entity may enter a search query in a browser. In response to the query, eligible content items matching the query are selected or identified. From the eligible content items, selection can be made of a particular content item that is associated with a distribution parameter identifying the particular entity. A user can be considered to follow an entity, for example, based on the user interacting with a "follow" element on the entity's social web page in a social networking system or requesting that content from an entity feed provided by the entity be presented in the user's social network interface. For example, a user that requests content from the entity feed be included in the user's social network feed can be considered to be a follower of the entity.

For situations in which the systems discussed here collect and/or use personal information about users, the users may be provided with an opportunity to enable/disable or control programs or features that may collect and/or use personal information (e.g., information about a user's social network, social actions or activities, a user's preferences or a user's current location). In addition, certain data may be treated in one or more ways before it is stored or used, so that personally identifiable information associated with the user is removed. For example, a user's identity may be anonymized so that the no personally identifiable information can be determined for the user, or a user's geographic location may be generalized where location information is obtained (such as to a city, ZIP code, or state level), so that a particular location of a user cannot be determined.

Figure 1:
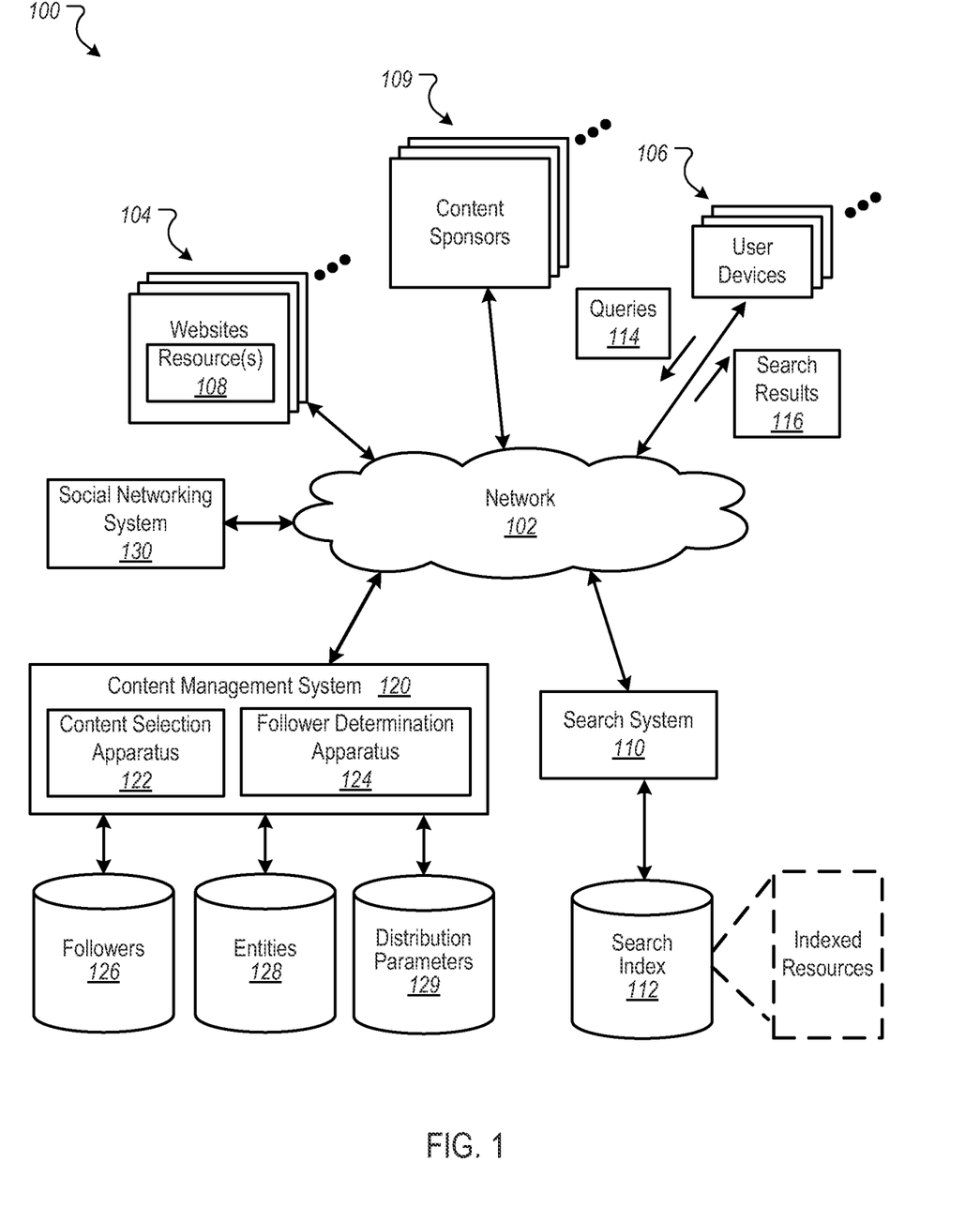
FIG. 1 is a block diagram of an example of an environment in which content is distributed.

FIG. 1 is a block diagram of an example environment 100 in which content is distributed. The environment 100 includes a search system 110 that provides search services and a content management system 120 that can provide a content item in response to a content item request associated with the resource. The environment 100 includes a network 102, e.g., a local area network (LAN), wide area network (WAN), the Internet, or a combination of them, that connects web sites 104, user devices 106, content sponsors 109, the search system 110, the content management system 120, and at least one social networking system 130. The environment 100 may include many thousands of publishers, web sites 104, content sponsors 109 and user devices 106.

A web site 104 can include one or more resources 108 associated with a domain name and hosted by one or more servers. An example web site is a collection of web pages formatted in hypertext markup language (HTML) or some other language that can contain text, images, multimedia content, and programming elements (e.g., scripts). Each web site 104 can be maintained by a publisher, e.g., a publishing entity that manages and/or owns the web property.

A resource 108 is any data that can be provided by the web site 104 over the network 102 and that is associated with a resource address. Resources 108 include HTML pages, word processing documents, portable document format (PDF) documents, images, video, and feed sources, to name a few examples. The resources 108 can include content, e.g., words, phrases, images and sounds, and may include embedded information (e.g., meta information and hyperlinks) and/or embedded instructions (e.g., scripts).

A user device 106 is an electronic device capable of requesting and receiving resources over the network 102. Example user devices 106 include personal computers, tablet computing devices, mobile communication devices (e.g., smartphones), and other devices that can send and receive data over the network 102. A user device 106 typically includes a user application, e.g., a web browser, to facilitate the sending and receiving of data over the network 102.

To facilitate searching of resources 108, the search system 110 can identify the resources 108 by crawling and indexing the resources 108 provided by the publishers of the web sites 104. Data about the resources 108 can be indexed based on the resource 108 to which the data corresponds. The indexed and, optionally, cached copies of the resources 108 can be stored in a search index 112.

The user devices 106 submit search queries 114 to the search system 110. In response, the search system 110 accesses the search index 112 to identify responsive resources that are predicted to be relevant to the search query 114, for example, based on measures of relevance that have been computed for the responsive resources. The search system 110 selects the responsive resources, generates search results 116 that identify the responsive resources, and returns the search results 116 to the user devices 106. A search result 116 is data generated by the search system 110 that references a responsive resource for a particular search query, and includes an active link (e.g., a URL) to the responsive resource. An example search result 116 can include a web page title, a snippet of text or a portion of an image extracted from the web page, and the URL of the web page.

User devices 106 receive the search results 116 and render the search results 116, for example, in the form of one or more web pages, for presentation to users. In response to the user selecting a link (e.g., URL) in a search result at a user device 106, the user device 106 requests the resource 108 referenced by the link. The web site 104 hosting the resource 108 receives the request for the resource 108 from the user device 106 and provides the resource 108 to the requesting user device 106.

Search results 116 are selected to be provided to a user device 106 in response to a search query 114 based on result scores. Result scores are scores that represent a measure of relevance (e.g., a predicted relevance) of the resource 108 to a search query. For example, a result score for a resource 108 can be computed based on an information retrieval ("IR") score corresponding to the resource 108 and, optionally, a quality score of the resource 108 relative to other available resources. A presentation order for the search results 116 can be selected based on the result scores. In turn, data that causes presentation of the search results 116 according to the presentation order can be provided to the user device 106.

The content management system 120 includes a content selection apparatus 122 that is configured to select content items to be provided with resources, such as publisher provided web pages or search results pages. Generally, the content items are selected in response to receipt of a request for a content item, which is referred to as a content item request. The content item request can include, for example, data identifying a network address of the resource with which the selected content item will be provided, data specifying a topic to which the resource is related, and in the context of a search results page, the search query in response to which the search results pages is being provided.

The content selection apparatus 122 can also select content items based, at least in part, on contextual information related to a potential recipient of the content item. For example, assume that the user device from which a content item request is received is logged into a user account. In this example, data provided by the user through the user account can be considered contextual information that can be used for content item selection. The contextual information can include, for example, whether the user is a follower of an entity feed. For example, a user who is interested in an entity may elect to follow (or stop following) an entity feed associated with an entity. The election can occur, for example, when the user selects a follow control within the social networking system 130. This can occur, for example, when the user visits a social web page associated with the entity and interacts with (e.g., clicks) the follow control. Users that explicitly request to follow the entity (e.g., by interacting with the follow control) are considered to be primary followers of the entity.

In some implementations, followers of an entity can also include secondary followers that have not explicitly requested to follow the entity, but are still considered followers based on their relationship with a primary follower of the entity. Secondary followers can include, for example, social network friends of the user who are primary follower of the entity or that may see information about the followed entity in the user's activity stream. In this example, the secondary followers are followers of the user, who are in turn followers of the entity. Other types of followers and follower relationships can exist. Further, content sponsors and/or entities can optionally specify the different types of followers and associated different ways in which content is to be selected and distributed.

In some implementations, the contextual information used by the content selection apparatus 122 to select content items includes information about followers of entity feeds. For example, as described in more detail below, the content selection apparatus 122 can use followers data 126 to identify followers of an entity feed associated with a selected one of the entities 128, and in turn, select one or more resources 108 based on that information. The resource(s) 108 can be provided, for example, to the user device 106 and distributed in a manner consistent with distribution parameters 129. For example, the distribution parameters 129 can specify that the content item is to be provided to users that are followers of an entity feed associated with the content item.

In some implementations, information in the distribution parameters 129 can be used to modify the creative (e.g., the content of the advertisement), the bid, or the format (e.g., replacing a text advertisement with a video advertisement when presented to a follower, or changing the advertisement's size or presentation). For example, a content item provider can provide a baseline bid that is submitted to an auction when a particular distribution keyword is matched by data in a content item request. The content item can further specify that the bid is eligible to be increased over the baseline bid when it is determined that the user to whom the content item will be presented is a follower of a particular entity.

Additionally, or alternatively, the content item provider can specify entity specific content that can be used to populate portions of the content item when the content item request specifies that the user is a follower of a particular entity. For example, a sports equipment distributor may specify that information about a product manufactured by the particular entity be included in the content item when the user to whom the content item will be presented is a follower of that particular entity.

In a detailed example, selection of a content item can occur, for example, by first identifying at least one eligible content item (e.g., having a keyword that matches information included in a request for content). A given eligible content item can have associated with it distribution parameters 129 associated with distributing content based on whether the users to whom the content item will be distributed are followers of entity feeds. In this example, the content selection apparatus 122 can perform additional steps. Specifically, the content selection apparatus 122 can determine if the user associated with the request is a follower of an entity feed associated with the eligible content item. If so, then a bid associated with the eligible content item and based on follower information, for example, can be entered into an auction. That bid can join with bids of other eligible content items, and the auction can be performed based on the bids in order to select a content item to be provided in response to the request. In some implementations, bids can be adjusted based on the determination that a user associated with a request for content is a follower of an entity feed for an entity associated with an eligible content item.

In some implementations, followers data 126 can be determined based on information from social networks (e.g., the social networking system 130) or other sources. For example, when a user elects to follow (or stop following) an entity feed associated with an entity, such as making an selection of a follow control within the social networking system 130, the content management system 120 or some other system can update the followers data 126 to include data indicating that the user is a follower (or no longer a follower) of the entity feed. In some implementations, information in the followers data 126 can be updated or refreshed on an as-needed, e.g., to periodically update the followers data 126 with followers information from the social networking system 130 and/or other sources (e.g., web pages associated with entities).

Figure 2:
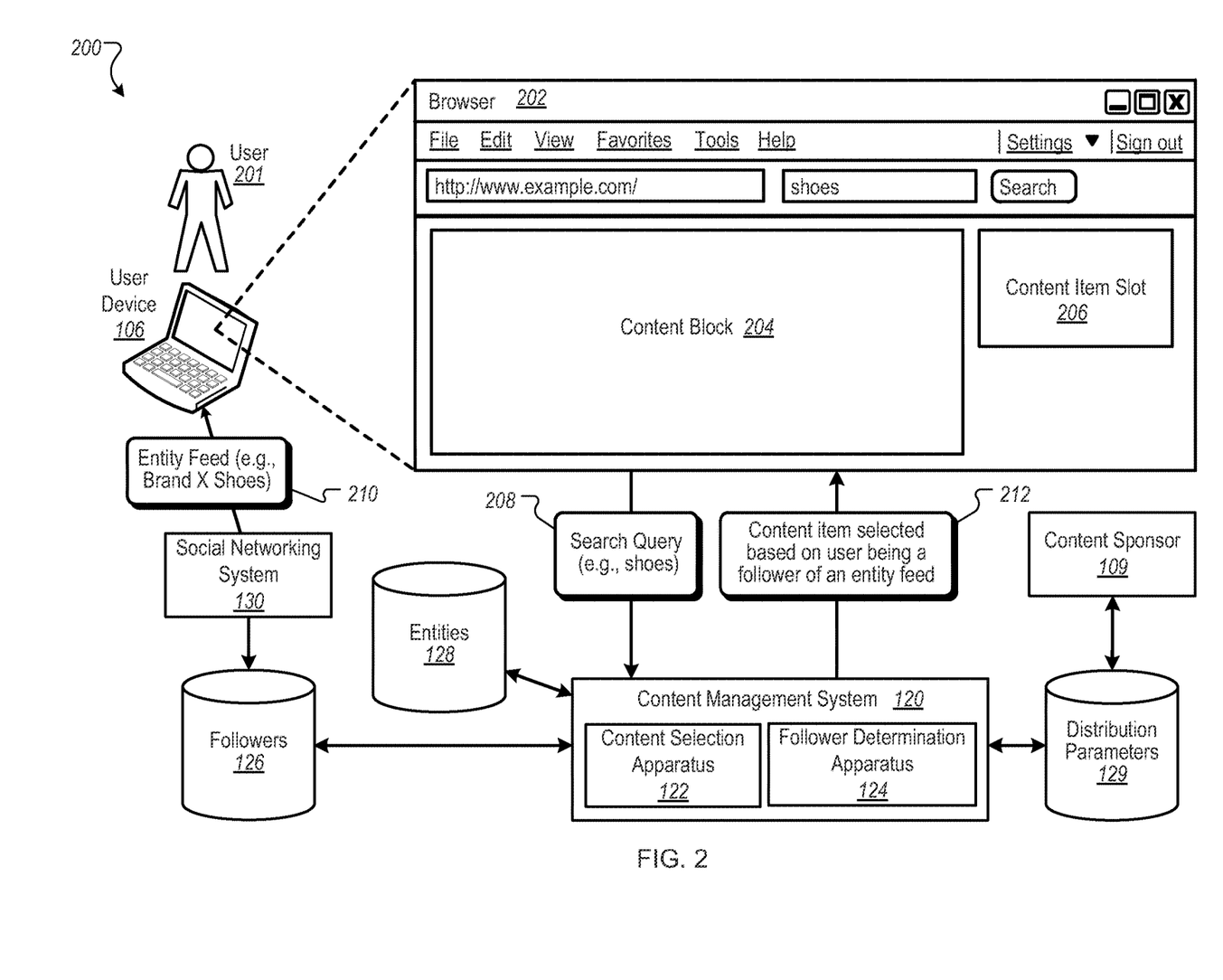
FIG. 2 is a block diagram illustrating an example of a system for selecting content items to be presented to users who are followers of entity feeds.

FIG. 2 is a block diagram illustrating a system 200 for selecting content items to be presented to users who are followers of entity feeds. As an example, the system 200 can select a content item 212 in response to a search query 208 received from a browser 202. The content item 212 that is selected can be selected based in part on whether a user 201 associated with the search query 208 is a follower of an entity feed 210, for example, that is related to the search query 208. For example, if the search query 208 is "shoes," and the user 201 is identified as a follower of the entity feed 210 for Brand X shoes, then the content item 212 that is selected by the content management system 120 can be an advertisement for Brand X Shoes.

In a detailed example, the content management system 120, for example, can receive the search query 208 from the browser 202, e.g., as a request for content to fill a content block 204 or a content item slot 206. In some implementations, a user identifier associated with the user 201 can accompany the search query 208, such as a user identifier that is maintained as part of a login service or identified in some other way (e.g., in a cookie). Using the user identifier, the follower determination apparatus 124, for example, can determine if the user 201 is a follower of any entity feeds, such as by looking up follower information for the user in the followers data 126. In this example, the user 201 can be identified as a follower of the entity feed 210 for a Brand X Shoes entity. The Brand X Shoes entity can be identified and/or distinguished from several other entities that the user 201 may follow, for example, based on the keyword "shoes" in the search query 208. In this example, the user may follow several entity feeds, including the entity feed 210 for Brand X Shoes. For purposes of content item selection, the follower determination apparatus 124, for example, can specifically identify the user as a follower of Brand X Shoes entity feed among others because, for example, it may be the only entity feed related to shoes.

The content selection apparatus 122, for example, can select from among eligible content items having distribution parameters that condition the distribution of a content item on the distribution parameters being met. For example, the distribution parameters can specify that content items are to be provided to users who are followers of entity feeds associated with a request for content (e.g., matching the search query 208 having keywords related to "shoes"). For example, an eligible content item can have associated distribution parameters 129 (e.g., as specified by a content sponsor 109) for selecting content items based on the determination that users that will receive the content items are followers of entity feeds. In this example, the content selection apparatus 122 can select an advertisement for Brand X Shoes, e.g., from among other eligible content items. The selection can be based, for example, on the user 201 being a follower of the entity feed 210 for Brand X Shoes. Upon the identification of a content item by the content selection apparatus 122, the content management system 120 can provide the content item 212 (e.g., the Brand X Shoes advertisement) in response to the search query 208.

Figure 3:
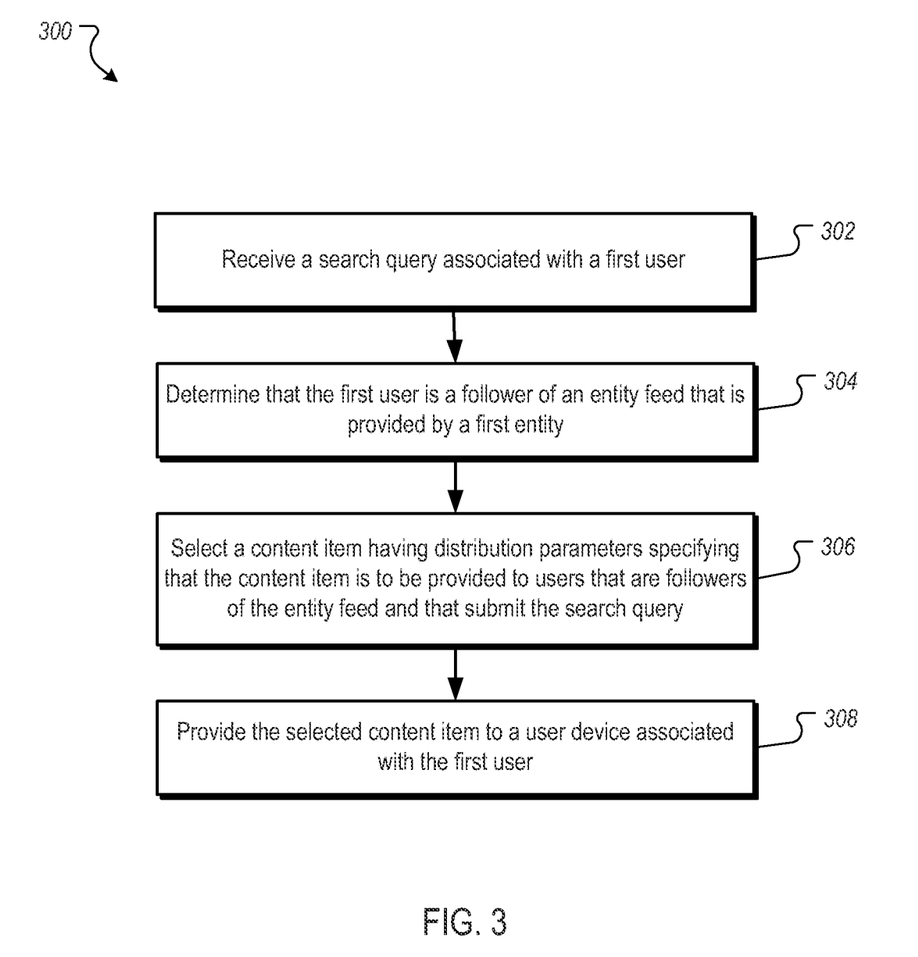
FIG. 3 is a flow chart showing an example of a process for providing content to users who are followers of entity feeds.

FIG. 3 is a flow chart showing an example process 300 for providing content to users who are followers of entity feeds. For example, the process 300 is a process by which a content item is selected for a user who is a follower of an entity feed, e.g., the entity feed 210 associated with the Brand X Shoes entity. The selection is made because the user follows the entity feed 210, and distribution parameters associated with the content item specify that the content item is to be provided to such followers. For example, the content item 212 can be provided in response to the search query 208 entered by the user 201 who follows the entity feed 210 in a social network, e.g., a social network page related to Brand X Shoes.

The process 300 can be implemented by one or more data processing apparatus from the environment 100, such as the content management system 120, the content selection apparatus 122, and/or the follower determination apparatus 124. The process 300 can be implemented as instructions stored on computer readable device, and execution of the instructions by data processing apparatus can cause the data processing apparatus to perform the operations of the process 300.

In some implementations, the process 300 includes steps for receiving and using content item provider distribution parameters for providing content items to followers of entities. These steps can occur, for example, before a request for content is received in step 302. For example, distribution parameters can be received from a content item provider that specify that the content item is eligible for distribution to users that submit a search query matching a distribution keyword and are determined to be followers of the entity feed. A bid specifying a maximum amount that the content item provider is willing pay for distribution of the content item based on the distribution parameters being met can also be received. In some implementations, the distribution parameters can include instructions, for example, for increasing bids in an auction for eligible content items when the user associated with a corresponding request for content is a follower of an entity feed. The distribution parameters can also specify entity specific content that will be used to populate the content item when the user is determined to be a follower of a particular entity.

For example, the content sponsor 109 or other content item provider associated with Brand X Shoes can define or otherwise submit distribution parameters 129 that specify that advertisements in the campaign are to be provided to users who are followers of Brand X Shoes (e.g., in one or more entity feeds) when a the distribution keyword "shoes" is part of a content item request. As part of the campaign definition process, for example, the content sponsor 109 can provide a maximum bid and/or other bidding parameters for selection of their content item according to the distribution parameters. After the search query 208 is received by the content management system 120, for example, the content selection apparatus 122 can determine that the search query 208 includes "shoes" that matches the distribution keyword "shoes" and use that information in selecting the Brand X Shoes advertisement.

A search query associated with a user is received (302). For example, the content management system 120 can receive the search query 208 (e.g., "shoes") entered in the browser 202 on the user device 106 associated with the user 201. The search query 208 may or may not explicitly reference an entity, such as a particular brand or manufacturer of shoes. In this example, the search query 208 can be a generic query that references shoes.

A determination is made that the first user is a follower of an entity feed that is provided by a first entity and that is provided through a social network (304). For example, the follower determination apparatus 124 can determine that the user 201 is a follower of Brand X Shoes. The user 201 may also be a follower of the entity feed 210, e.g., in an activity stream or other feed, blog or resource provided by or associated with the Brand X Shoes entity that can be followed by users in a social network (e.g., the social networking system 130). The determination that the user is a follower of a particular entity can be made, for example, using information available from the social networking system 130. For example, information stored in the followers data 126 can identify the user 201 as a follower of Brand X Shoes. The information identifying the user 201 as a follower of Brand X Shoes can be included in the followers data 126, for example, based on the user having performed some action to begin following the shoe brand's social network page. For example, the user 201 may have interacted with a follow control or some other mechanism that enables the user to become a follower of Brand X Shoes.

In some implementations, determining that the first user is a follower of the entity feed can include determining that the first user is a primary follower of the entity feed. The determination is based, for example, on information indicating that a request was made to receive the entity feed. In this example, the first user's request to receive the entity feed can be independent of the first entity requesting to receive the first user's feed. As an example, the user 201 may have decided, within a social network (e.g., the social networking system 130), to follow the social network page related to Brand X Shoes. As a result, information associated with Brand X Shoes that appears in the Brand X Shoes entity feed (e.g., activity stream) can be enabled to appear in the feed of the user 201. The fact that the user 201 follows Brand X Shoes can occur even though, for example, Brand X Shoes has not chosen to follow the feed of the user 201. As such, a one-way following can be sufficient in determining that the user 201 is a follower of the entity, but two-way following examples are also possible.

In some implementations, determining that the first user is a follower of the entity feed can include determining that the first user is a secondary follower of the entity feed. This determination can be based, for example, on information that the secondary follower follows a primary follower. As an example, consider the case in which the user 201 is not a primary follower of the entity feed 210 for Brand X Shoes. However, the user 201 can be considered to be a secondary follower if a social network friend of the user 201 is a follower of the entity feed 210 for Brand X Shoes. In this example, the follower determination apparatus 124 can determine that the user 201 is a follower of the Brand X Shoes entity feed by way of being a secondary or indirect follower. Specifically, while the user 201 is not a direct follower of the Brand X Shoes entity feed, the user 201 has a friend in the social network who is a primary (e.g., direct) follower of the Brand X Shoes entity feed. In some implementations, regarding this example, content sponsors 109 can elect to include distribution parameters 129 for providing their content items to secondary followers, e.g., users who may happen to see a feed of an entity in a friend's activity stream.

A content item is selected based on the search query and the determination that the first user is a follower of the first entity. The content item that is selected can have distribution parameters specifying that the content item is to be provided to users that are followers of the entity feed and that have submitted the search query (306). For example, the content selection apparatus 122 can select a shoe advertisement related to Brand X Shoes. The advertisement may be part of an advertising campaign that includes distribution parameters 129 specifying that the advertisement is to be provided to users who are followers of the Brand X Shoes social network page, e.g., including providing the advertisement when a follower of Brand X Shoes enters a query for shoes and/or in other situations. The selection of the shoe advertisement can be made in part because the advertisement is eligible for selection based on it being associated with the keyword "shoes," e.g., by matching the "shoes" term in the search query 208, as described above. The selection is also based, for example, on the user 201 being a follower of Brand X Shoes, such as on a social network or by some other way of following the product or manufacturer. The selection of the Brand X Shoes advertisement can be made instead of other eligible content items, including other shoe-related advertisement for which there may be no associated entity feeds followed by the user 201.

Other factors in addition to follower information can be used in selecting content and bids for auctions. In some implementations, a portion of the eligible content items can be filtered out, e.g., advertisements associated with entities that are direct competitors of, e.g., the Brand X Shoes. For example, the content selection apparatus 122 can avoid selecting content for competing entities that may have products and/or services in the same category or sub-category as Brand X Shoes. In some implementations, auctions can include negative bidding, e.g., to avoid or lower a bid of a competing eligible content item, e.g., by bidding lower for an eligible content item for a cheap shoe store using information about the user 201, the search query 208, and/or the Brand X Shoes entity.

In some implementations, the process 300 further includes steps for providing content based on correlations between first and second entities. Specifically, a determination can be made that the first entity and a second entity are correlated entities based on similarities between online activity related to both of the first and the second entity. For example, the content management system 120 can make a determination that a high percentage of followers of Brand X Shoes are also followers of Brand Y Running Shorts. This correlation can be determined, for example, based on activity exhibited by the user 201 and/or other users in the social networking system 130 who may have a pattern of being associated with, following, and/or interacting with both entities in some way.

In response to determining that the first entity and the second entity are correlated entities, a content item for the second entity can be provided based on the user being a follower of the entity feed for the first entity. Continuing with the example above, the content management system 120 can provide a Brand Y Running Shorts advertisement in addition to (or instead of) a Brand X Shoes advertisement based on the determination that these two entity are correlated entities.

In some implementations, determining that the first entity and the second entity are correlated entities includes determining that a search page co-occurrence rate for the first entity and the second entity meets a threshold search page co-occurrence rate, where the search page co-occurrence rate is based on a number of search result pages in which both the first entity and the second entity are referenced relative to a total number of search results pages in which at least one of the first entity or the second entity are referenced. For example, the content management system 120 can determine that the Brand X Shoes entity and the Brand Y Running Shorts entity are correlated based on search page co-occurrence rates. Specifically, the correlation between the entities can be determined to exist if both entities occur (e.g., are referenced) a minimum percentage of instances when a search results page references at least one or the other entity.

In some implementations, determining that the first entity and the second entity are correlated entities includes determining that a user co-selection rate for the first entity and the second entity meets a threshold user co-selection rate, where the user co-selection rate is based on a number of users that have interacted with content items provided by each of the first entity and the second entity relative to a total number of users that have interacted with a content item provided by one of the first entity or the second entity. For example, the content management system 120 can determine that the Brand X Shoes entity and the Brand Y Running Shorts entity are correlated based on user co-selection rates. Specifically, the correlation can be determined if content items for both entities receive a user selection rate including a minimum percentage of instances relative to user selection of content items for at least one or the other entity.

The selected content item is provided to a user device associated with the first user (308). For example, the content management system 120 can provide the content item 212, such as an advertisement for Brand X Shoes. In some implementations, the content item that is provided to the user device can be customized in some way based on follower information. For example, the content item can be annotated to insert information associated with the entity, e.g., including the name of the entity, products and/or services associated with the entity, links to web pages or other resources associated with the entity, or other information.

Figure 4:
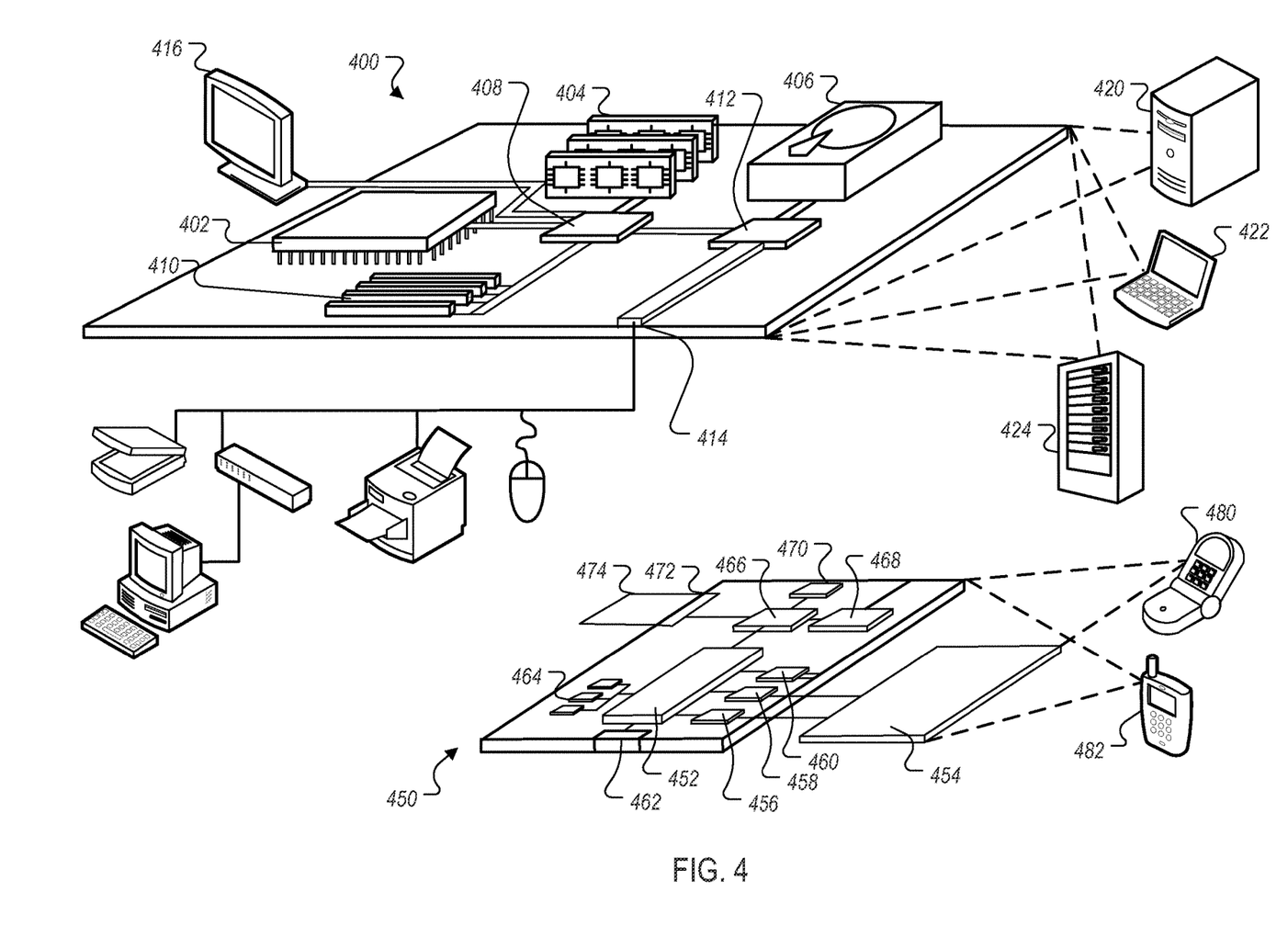
FIG. 4 is a block diagram of example computing devices that may be used to implement the systems and methods described in this document.

FIG. 4 is a block diagram of computing devices 400, 450 that may be used to implement the systems and methods described in this document. The computing devices 400, 450 may be implemented as one or more clients or one or more servers, or combinations of clients and servers. Computing device 400 is intended to represent various forms of digital computers, such as laptops, desktops, workstations, personal digital assistants, servers, blade servers, mainframes, and other appropriate computers. Computing device 450 is intended to represent various forms of mobile devices, such as personal digital assistants, cellular telephones, smartphones, and other similar computing devices. The components shown here, their connections and relationships, and their functions, are meant to be examples only, and are not meant to limit implementations of the inventions described and/or claimed in this document.

Computing device 400 includes a processor 402, memory 404, a storage device 406, a high-speed interface 408 connecting to memory 404 and high-speed expansion ports 410, and a low speed interface 412 connecting to low speed bus 414 and storage device 406. Each of the components 402, 404, 406, 408, 410, and 412, are interconnected using various busses, and may be mounted on a common motherboard or in other manners as appropriate. The processor 402 can process instructions for execution within the computing device 400, including instructions stored in the memory 404 or on the storage device 406 to display graphical information for a GUI on an external input/output device, such as display 416 coupled to high speed interface 408. In other implementations, multiple processors and/or multiple buses may be used, as appropriate, along with multiple memories and types of memory. Also, multiple computing devices 400 may be connected, with each device providing portions of the necessary operations (e.g., as a server bank, a group of blade servers, or a multi-processor system).

The memory 404 stores information within the computing device 400. In one implementation, the memory 404 is a computer-readable medium. In one implementation, the memory 404 is a volatile memory unit or units. In another implementation, the memory 404 is a non-volatile memory unit or units.

The storage device 406 is capable of providing mass storage for the computing device 400. In one implementation, the storage device 406 is a computer-readable medium. In various different implementations, the storage device 406 may be a floppy disk device, a hard disk device, an optical disk device, or a tape device, a flash memory or other similar solid state memory device, or an array of devices, including devices in a storage area network or other configurations. In one implementation, a computer program product is tangibly embodied in an information carrier. The computer program product contains instructions that, when executed, perform one or more methods, such as those described above. The information carrier is a computer- or machine-readable medium, such as the memory 404, the storage device 406, or memory on processor 402.

The high speed controller 408 manages bandwidth-intensive operations for the computing device 400, while the low speed controller 412 manages lower bandwidth-intensive operations. Such allocation of duties is an example only. In one implementation, the high-speed controller 408 is coupled to memory 404, display 416 (e.g., through a graphics processor or accelerator), and to high-speed expansion ports 410, which may accept various expansion cards (not shown). In the implementation, low-speed controller 412 is coupled to storage device 406 and low-speed expansion port 414. The low-speed expansion port, which may include various wired or wireless communication ports may be coupled to one or more input/output devices, such as a keyboard, a pointing device, a scanner, or a networking device such as a switch or router, e.g., through a network adapter.

The computing device 400 may be implemented in a number of different forms, as shown in the figure. For example, it may be implemented as a standard server 420, or multiple times in a group of such servers. It may also be implemented as part of a rack server system 424. In addition, it may be implemented in a personal computer such as a laptop computer 422. Alternatively, components from computing device 400 may be combined with other components in a mobile device (not shown), such as device 450. Each of such devices may contain one or more of computing device 400, 450, and an entire system may be made up of multiple computing devices 400, 450 communicating with each other.

Computing device 450 includes a processor 452, memory 464, an input/output device such as a display 454, a communication interface 466, and a transceiver 468, among other components. The device 450 may also be provided with a storage device, such as a microdrive or other device, to provide additional storage. Each of the components 450, 452, 464, 454, 466, and 468, are interconnected using various buses, and several of the components may be mounted on a common motherboard or in other manners as appropriate.

The processor 452 can process instructions for execution within the computing device 450, including instructions stored in the memory 464. The processor may also include separate analog and digital processors. The processor may provide, for example, for coordination of the other components of the device 450, such as control of user interfaces, applications run by device 450, and wireless communication by device 450.

Processor 452 may communicate with a user through control interface 458 and display interface 456 coupled to a display 454. The display 454 may be, for example, a TFT LCD display or an OLED display, or other appropriate display technology. The display interface 456 may comprise appropriate circuitry for driving the display 454 to present graphical and other information to a user. The control interface 458 may receive commands from a user and convert them for submission to the processor 452. In addition, an external interface 462 may be provide in communication with processor 452, so as to enable near area communication of device 450 with other devices. External interface 462 may provide, for example, for wired communication (e.g., via a docking procedure) or for wireless communication (e.g., via Bluetooth® or other such technologies).

The memory 464 stores information within the computing device 450. In one implementation, the memory 464 is a computer-readable medium. In one implementation, the memory 464 is a volatile memory unit or units. In another implementation, the memory 464 is a non-volatile memory unit or units. Expansion memory 474 may also be provided and connected to device 450 through expansion interface 472, which may include, for example, a SIMM card interface. Such expansion memory 474 may provide extra storage space for device 450, or may also store applications or other information for device 450. Specifically, expansion memory 474 may include instructions to carry out or supplement the processes described above, and may include secure information also. Thus, for example, expansion memory 474 may be provide as a security module for device 450, and may be programmed with instructions that permit secure use of device 450. In addition, secure applications may be provided via the SIMM cards, along with additional information, such as placing identifying information on the SIMM card in a non-hackable manner.

The memory may include for example, flash memory and/or MRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 464, expansion memory 474, or memory on processor 452.

Device 450 may communicate wirelessly through communication interface 466, which may include digital signal processing circuitry where necessary. Communication interface 466 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 468. In addition, short-range communication may occur, such as using a Bluetooth®, WiFi, or other such transceiver (not shown). In addition, GPS receiver module 470 may provide additional wireless data to device 450, which may be used as appropriate by applications running on device 450.

Device 450 may also communicate audibly using audio codec 460, which may receive spoken information from a user and convert it to usable digital information. Audio codec 460 may likewise generate audible sound for a user, such as through a speaker, e.g., in a handset of device 450. Such sound may include sound from voice telephone calls, may include recorded sound (e.g., voice messages, music files, etc.) and may also include sound generated by applications operating on device 450.

The computing device 450 may be implemented in a number of different forms, as shown in the figure. For example, it may be implemented as a cellular telephone 480. It may also be implemented as part of a smartphone 482, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method performed by one or more data processing apparatus, the method comprising:
   identifying, within a database structure, a list of users that performed a particular action at an online resource of a first entity;
   receiving a search query that does not reference the first entity from a client device of a particular user that is accessing one or more online resources of an entity that differs from the first entity; and
   responding to the search query received form the client device of the particular user, including:
      determining that the search query matches a distribution parameter for a set of content items;
      determining, based on information contained in a cookie at the client device, whether the particular user that submitted the search query is included in the list of users that performed the particular action at the online resource of the first entity independent of the first entity being a follower of the particular user in a social network and independent of whether social network friends of the particular user performed the particular action at the online resource of the first entity;

when the particular user that submitted the search query is determined to be included in the list of users that performed the particular action at the online resource of the first entity, selecting, from among the set of content items having the distribution parameter, a first content item provided by the first entity having distribution parameters specifying that the first content item is to be provided to users that (i) are included in the list of users that performed the particular action at the online resource of the first entity and that (ii) submit the search query that matches the distribution parameter;

otherwise, selecting, by the one or more data processing apparatus, a different content item, from among the set of content items, that is provided by a different entity; and providing, by the one or more data processing apparatus, one of the first content item or the different content item that was selected.

2. The method of claim 1, wherein selecting the different content item that is provided by the different entity comprises selecting the different content item based on a determination that the first entity and the different entity are correlated entities.

3. The method of claim 2, wherein determining that the first entity and the different entity are correlated entities is based on similarities between online activity related to both of the first entity and the different entity.

4. The method of claim 2, further comprising:
providing, in response to determining that the first entity and the different entity are correlated entities, a content item for the different entity based on the particular user that performed the particular action at the online resource of the first entity.

5. The method of claim 2, wherein determining that the first entity and the different entity are correlated entities comprises determining that a search page co-occurrence rate for the first entity and the different entity meets a threshold search page co-occurrence rate, wherein the search page co-occurrence rate is based on a number of search result pages in which both the first entity and the different entity are referenced relative to a total number of search results pages in which at least one of the first entity or the different entity are referenced.

6. The method of claim 2, wherein determining that the first entity and the different entity are correlated entities comprises determining that a user co-selection rate for the first entity and the different entity meets a threshold user co-selection rate, wherein the user co-selection rate is based on a number of users that have interacted with content items provided by each of the first entity and the different entity relative to a total number of users that have interacted with a content item provided by one of the first entity or the different entity.

7. The method of claim 1, further comprising:
receiving, from a content item provider, distribution parameters specifying that the first content item is eligible for distribution to users that submit a search query matching a distribution keyword and performed the particular action at the online resource of the first entity;

receiving a bid specifying a maximum amount that the content item provider will pay for distribution of the first content item based on the distribution parameters being met; and determining that the received search query matches the distribution keyword.

8. A non-transitory computer storage medium encoded with a computer program, the computer program comprising instructions that when executed by one or more data processing apparatus cause the one or more data processing apparatus to perform operations comprising:

identifying, within a database structure, a list of users that performed a particular action at an online resource of a first entity;

receiving a search query that does not reference the first entity from a client device of a particular user that is accessing one or more online resources of an entity that differs from the first entity; and responding to the search query received form the client device of the particular user, including:

determining that the search query matches a distribution parameter for a set of content items;

determining, based on information contained in a cookie at the client device, whether the particular user that submitted the search query is included in the list of users that performed the particular action at the online resource of the first entity independent of the first entity being a follower of the particular user in a social network and independent of whether social network friends of the particular user performed the particular action at the online resource of the first entity;

when the particular user that submitted the search query is determined to be included in the list of users that performed the particular action at the online resource of the first entity, selecting, from among the set of content items having the distribution parameter, a first content item provided by the first entity having distribution parameters specifying that the first content item is to be provided to users that (i) are included in the list of users that performed the particular action at the online resource of the first entity and that (ii) submit the search query that matches the distribution parameter;

otherwise, selecting, by the one or more data processing apparatus, a different content item that is provided by a different entity; and providing, by the one or more data processing apparatus, one of the first content item or the different content item that was selected.

9. The non-transitory computer storage medium of claim 8, wherein selecting the different content item that is provided by the different entity comprises selecting the different content item based on a determination that the first entity and the different entity are correlated entities.

10. The non-transitory computer storage medium of claim 9, wherein determining that the first entity and the different entity are correlated entities is based on similarities between online activity related to both of the first entity and the different entity.

11. The non-transitory computer storage medium of claim 9, the operations further comprising:
providing, in response to determining that the first entity and the different entity are correlated entities, a content item for the different entity based on the particular user that performed the particular action at the online resource of the first entity.

12. The non-transitory computer storage medium of claim 9, wherein determining that the first entity and the different entity are correlated entities comprises determining that a search page co-occurrence rate for the first entity and the different entity meets a threshold search page co-occurrence rate, wherein the search page co-occurrence rate is based on a number of search result pages in which both the first entity and the different entity are referenced relative to a total number of search results pages in which at least one of the first entity or the different entity are referenced.

13. The non-transitory computer storage medium of claim 9, wherein determining that the first entity and the different entity are correlated entities comprises determining that a user co-selection rate for the first entity and the different entity meets a threshold user co-selection rate, wherein the user co-selection rate is based on a number of users that have interacted with content items provided by each of the first entity and the different entity relative to a total number of users that have interacted with a content item provided by one of the first entity or the different entity.

14. The non-transitory computer storage medium of claim 8, the operations further comprising:
  receiving, from a content item provider, distribution parameters specifying that the first content item is eligible for distribution to users that submit a search query matching a distribution keyword and performed the particular action at the online resource of the first entity;
  receiving a bid specifying a maximum amount that the content item provider will pay for distribution of the first content item based on the distribution parameters being met; and
  determining that the received search query matches the distribution keyword.

15. A system comprising:
  a first data store storing entity definitions for a plurality of entities;
  a second data store storing information for users who performed actions at online resources associated with the plurality of entities;
  a third data store storing distribution parameters for eligible content items, the distribution parameters identified by at least content sponsors and specifying conditions for selecting content items from among the eligible content items for presentation to users that that performed particular actions at online resources of the plurality of entities; and
  one or more data processing apparatus configured to interact with the first, second, and third data stores, the one or more data processing apparatus being further configured to perform operations comprising:
    identifying a list of users that performed a particular action at an online resource of a first entity;
    receiving a search query that does not reference the first entity from a client device of a particular user that is accessing one or more online resources of an entity that differs from the first entity; and
    responding to the search query received form the client device of the particular user, including:
      determining that the search query matches a distribution parameter for a set of content items;
      determining, based on information contained in a cookie at the client device, whether the particular user that submitted the search query is included in the list of users that performed the particular action at the online resource of the first entity independent of the first entity being a follower of the particular user in a social network and independent of whether social network friends of the particular user performed the particular action at the online resource of the first entity;
      when the particular user that submitted the search query is determined to be included in the list of users that performed the particular action at the online resource of the first entity, selecting, from among the set of content items having the distribution parameter, a first content item provided by the first entity having distribution parameters specifying that the content item is to be provided to users that (i) are included in the list of users that performed the particular action at the online resource of the first entity and that (ii) submit the search query that matches the distribution parameter;
      otherwise selecting a different content item that is provided by a different entity; and
      providing one of the first content item or the different content item that was selected.

16. The system of claim 15, wherein selecting the different content item that is provided by the different entity comprises selecting the different content item based on a determination that the first entity and the different entity are correlated entities.

17. The system of claim 16, wherein determining that the first entity and the different entity are correlated entities is based on similarities between online activity related to both of the first entity and the different entity.

18. The system of claim 16, wherein determining that the first entity and the different entity are correlated entities comprises determining that a search page co-occurrence rate for the first entity and the different entity meets a threshold search page co-occurrence rate, wherein the search page co-occurrence rate is based on a number of search result pages in which both the first entity and the different entity are referenced relative to a total number of search results pages in which at least one of the first entity or the different entity are referenced.

19. The system of claim 16, wherein determining that the first entity and the different entity are correlated entities comprises determining that a user co-selection rate for the first entity and the different entity meets a threshold user co-selection rate, wherein the user co-selection rate is based on a number of users that have interacted with content items provided by each of the first entity and the different entity relative to a total number of users that have interacted with a content item provided by one of the first entity or the different entity.

20. The system of claim 15, the operations further comprising:
  receiving, from a content item provider, distribution parameters specifying that the first content item is eligible for distribution to users that submit a search query matching a distribution keyword and performed the particular action at the online resource of the first entity;
  receiving a bid specifying a maximum amount that the content item provider will pay for distribution of the first content item based on the distribution parameters being met; and
  determining that the received search query matches the distribution keyword.

* * * * *